June 24, 1930. R. A. KLOCK 1,766,026
METHOD AND APPARATUS FOR COOLING ELECTROLYTIC CELLS AND THE LIKE
Filed July 17, 1924
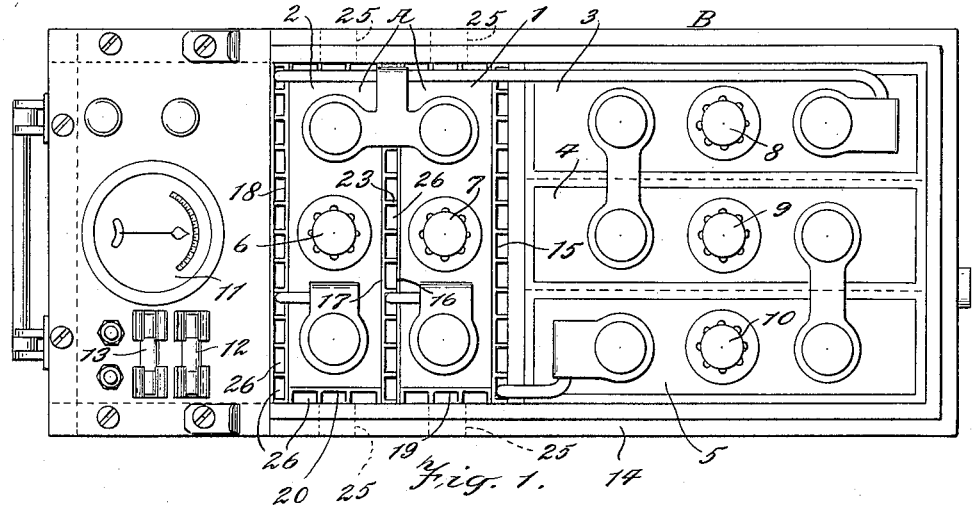
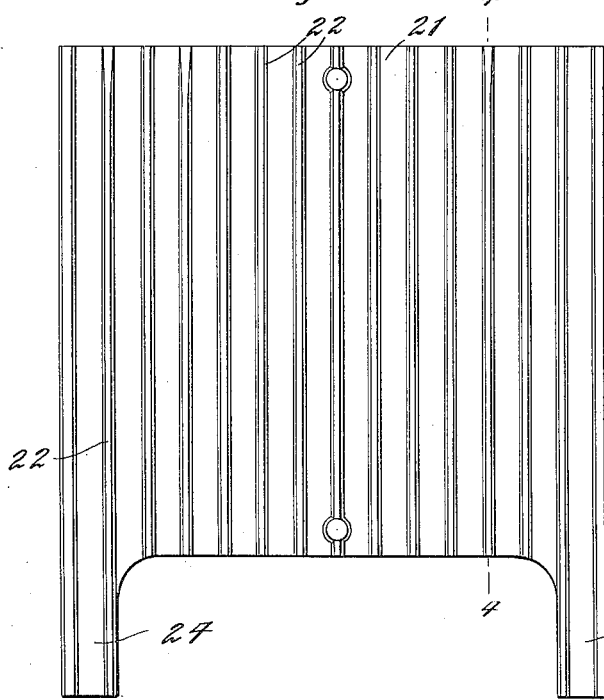
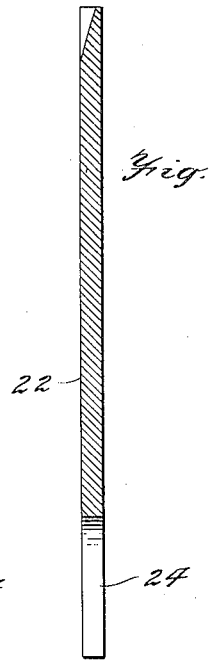
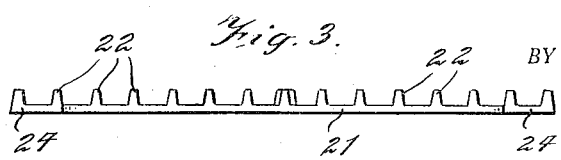

Patented June 24, 1930

1,766,026

UNITED STATES PATENT OFFICE

RAYMOND A. KLOCK, OF CLOSTER, NEW JERSEY, ASSIGNOR, BY MESNE ASSIGNMENTS, TO GOULD STORAGE BATTERY COMPANY, INC., OF NEW YORK, N. Y., A CORPORATION OF NEW YORK

METHOD AND APPARATUS FOR COOLING ELECTROLYTIC CELLS AND THE LIKE

Application filed July 17, 1924. Serial No. 726,415.

In the use of electrolytic cells it is necessary to employ a container which is resistant to the electrolyte employed, and of insulating material. Containers for this purpose are usually of composition material. The material most commonly used is vulcanized rubber composition which may easily be molded to the required shape and size and which is relatively inexpensive. Containers of the type usually employed are poor conductors of heat. In the normal operation of electrolytic cells, such as rectifiers, storage batteries, etc., considerable heat is developed on account of the chemical action taking place therein. It is necessary that this heat be dissipated in an efficient manner in order to secure the best operative results from the cell. This is particularly true where the cell is enclosed and to which the air does not have free access.

I have therefore discovered a method and have devised means for economically dissipating the generated heat automatically.

My invention will be better understood by reading the following description taken in connection with the accompanying drawing forming a part thereof, and in which:

Fig. 1 is a plan view of the battery and rectifier embodying my invention;

Fig. 2 is a side elevation of one of the cooling plates;

Fig. 3 is a top plan view of the plate shown in Fig. 2; and

Fig. 4 is a section taken on line 4—4 of Fig. 2.

In the drawing the rectifier A is made up of two cells 1 and 2 and the battery B is made up of three cells 3, 4 and 5. The rectifier cells have the usual vent caps 6 and 7 and the battery likewise has vent caps 8, 9 and 10. Each cell of the rectifier includes a container and so does each cell of the battery. The rectifier and the battery may be of any well-known construction and do not per se constitute a part of my invention. The rectifier and the battery, together with the voltmeter 11, fuses 12 and 13, are placed in a container 14.

The cells 1 and 2 of the rectifier A are surrounded by cooling plates 15 and 16, and 17 and 18, respectively, on the sides, and on one end by the plates 19 and 20 and on the other end by plates (not shown) similar to the plates 19 and 20. As shown in Figs. 2, 3 and 4, the cooling plates are provided with a web 21 and ribs or fins 22. One side of each plate is smooth and the smooth side is placed against the rectifier cell, as shown. The ribs in the particular embodiment shown in Figs. 2, 3 and 4 are integral with the web. While this is the preferred form of plate, it is not necessary that the ribs should be integral with the web. For instance, the plate 16, which is placed against the cell 1 of the rectifier, is a plain plate without any ribs, but against which the ribs on the plate 17 bear. The ribs 23 on the plate 17 act to dissipate the heat from both plates 16 and 17.

As will be seen from Fig. 2, the plate 21 is cut away at its lower central portion to provide legs 24. These legs rest upon the bottom of the container 14 and act to support the cooling plate in position. The space between the legs 24 permits the entrance of air through the openings 25 shown in dotted lines in the container 14 of Fig. 1. Any desired number of openings may be provided and these may be located as desired.

The plates 15, 16, 17, 18 and 21 are composed of material having good heat conductivity. These plates may be made of any desired material but will usually be made of metal, such as lead, copper or iron. When material other than lead is used it is advisable to lead-plate the plates in order to protect them against the action of the acid electrolyte to prevent corrosion.

From the foregoing it will be noted that the heat generated in the rectifier or battery is transmitted through the sides of the container to a metal plate which is in direct contact with the container of the cell. The heat is then transmitted through the cooling plate and dissipated by the ribs or fins and taken up by the air which circulates through the channels 26 between the ribs. By this arrangement the heat is much more efficiently dissipated and the temperature of the cell maintained within the proper range easier than if the provision of the cooling plates with the arrangement shown were not provided.

In practice I have found that a cast plate of 6% antimonial lead with ribs or fins spaced approximately on $\frac{7}{16}$ inch centers with an entire depth of the plate of $\frac{1}{4}$ inch is quite satsifactory. These proportions may be greatly changed, however, depending upon the conditions and upon the amount of heat to be dissipated.

While I have shown the invention applied principally to the rectifier A of Fig. 1, I wish it to be understood that a similar arrangement of plates around the battery B may be made, if desired. In the arrangement shown the rectifier temperature varies much greater than does that of the battery.

The heat generated by the cell is enough to cause the air to circulate automatically through the channels 26 sufficiently to dissipate the heat and maintain the temperature of the cell within the desired limits. If for any reason additional circulation should be desired, this may be provided by any well-known means, such as a pressure or vacuum pump.

Many changes in details and arrangement of the parts may be made without departing from the spirit of my invention.

I claim:

In an electrical device including an enclosure, a container and an electrolytic device within the container, means for dissipating heat generated within the container comprising a plurality of plates disposed against and coextensive with the sides of the container, said plates being smooth at one side and having vertically extending ribs at the other, other plates smooth on both sides disposed against the ribs of the first named plates to define a series of vertical flues extending from top to bottom of the device, the enclosure having openings at its lower portion, and said plates being cut away at their lower ends to define an air circulating space in communication with said vertical flues and said openings.

RAYMOND A. KLOCK.